United States Patent
Blommaert et al.

(10) Patent No.: US 9,526,003 B2
(45) Date of Patent: Dec. 20, 2016

(54) SECURE BOOTSTRAPPING ARCHITECTURE METHOD BASED ON PASSWORD-BASED DIGEST AUTHENTICATION

(75) Inventors: Marc Blommaert, Tamise (BE); Guenther Horn, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 333 days.

(21) Appl. No.: 12/918,856

(22) PCT Filed: Feb. 25, 2008

(86) PCT No.: PCT/EP2008/001479
§ 371 (c)(1),
(2), (4) Date: Feb. 28, 2011

(87) PCT Pub. No.: WO2009/106091
PCT Pub. Date: Sep. 3, 2009

(65) Prior Publication Data
US 2011/0145575 A1    Jun. 16, 2011

(51) Int. Cl.
*H04L 29/06*    (2006.01)
*H04W 12/06*    (2009.01)

(52) U.S. Cl.
CPC ............ *H04W 12/06* (2013.01); *H04L 63/083* (2013.01); *H04L 63/12* (2013.01); *H04L 63/168* (2013.01)

(58) Field of Classification Search
CPC ...... H04L 63/083; H04L 63/168; H04W 12/06
USPC .......................................................... 713/171
See application file for complete search history.

(56) References Cited

U.S. PATENT DOCUMENTS

| | | | |
|---|---|---|---|
| 2005/0044365 A1* | 2/2005 | Haukka et al. ............... | 713/171 |
| 2005/0157880 A1* | 7/2005 | Kurn et al. .................... | 380/279 |
| 2006/0236106 A1 | 10/2006 | Patel ............................. | 713/169 |
| 2006/0282882 A1 | 12/2006 | Bajko et al. ...................... | 726/4 |
| 2007/0005963 A1* | 1/2007 | Eldar et al. ................... | 713/168 |
| 2007/0042754 A1* | 2/2007 | Bajikar et al. ................ | 455/411 |
| 2007/0286376 A1* | 12/2007 | Maximo ............... | H04L 63/083 379/201.01 |
| 2008/0016230 A1 | 1/2008 | Holtmanns et al. .......... | 709/229 |
| 2008/0301785 A1* | 12/2008 | Beyer ..................... | H04L 63/08 726/5 |

OTHER PUBLICATIONS

"Generic Bootstrapping Architecture (GBA) Framework", Mar. 2006, 59 pages.*

(Continued)

*Primary Examiner* — Kenneth Chang
*Assistant Examiner* — Thaddeus Plecha
(74) *Attorney, Agent, or Firm* — Harrington & Smith (57) ABSTRACT

The present invention is related to a method, apparatus, and computer program product, in which a password-based digest access authentication procedure is used for performing authentication between a client and a server, wherein the authentication procedure is secured by at least one of modifying a digest-response parameter with a user password and generating a bootstrapped key based on the user password and at least one fresh parameter not used in a previous protocol run between the client and the server.

16 Claims, 5 Drawing Sheets

(56) References Cited

OTHER PUBLICATIONS

Korhonen, "Applying Generic Bootstrapping Architecture for use with Constrained Devices", 2012, 3 pages.*
3GPP TS 33.220, V7.1.1 (Oct. 2005), "3$^{rd}$ Generation Partnership Project; Technical Specification Group Services and System Aspects; Generic Authentication Architecture (GAA); Generic bootstrapping architecture (Release 7)", 61 pgs.
Franks, J., et al., "HTTP Authentication: Basic and Digest Access Authentication", © 1999, The Internet Society, 34 pgs., RFC-2617.

* cited by examiner

SECURE BOOTSTRAPPING ARCHITECTURE METHOD BASED ON PASSWORD-BASED DIGEST AUTHENTICATION

FIELD OF THE INVENTION

The present invention relates to a method and apparatus for performing authentication between a client and a server, and more specifically to a secure bootstrapping mechanism based on password-based Hypertext Transfer Protocol (HTTP) digest authentication.

BACKGROUND OF THE INVENTION

Security of mobile terminals, such as portable communication devices (e.g., cellular telephones or user equipments (UEs)), portable digital assistants, laptop computers, or any suitable device that is capable of communicating with a wireless network, is increasingly important to mobile terminal users. Security algorithms may be employed to achieve security between a mobile terminal and another network entity. These security algorithms often rely upon a secret that is shared between the mobile terminal and the other network entity which permits the mobile terminal to be authenticated. Typically, this shared secret is embodied in a form of a key.

A bootstrapping server function (BSF) is an intermediary element in cellular networks which provides application independent functions for mutual authentication of mobile terminals and servers are known to each other and for bootstrapping the exchange of secret session keys afterwards. This allows use of additional services which need authentication and secure communication. In this case, the term "bootstrapping" is related to building a security relation with a previously unknown device first and to allow installing security elements (e.g. keys) in the device and the BSF afterwards. The setup and function to deploy a generic security relation is sometimes called generic bootstrapping architecture (GBA) or generic authentication architecture (GAA).

The GBA as specified in $3^{rd}$ generation partnership protocol (3GPP) specification TS 33.220 is currently based on the fact that a user is in possession of a user identity module (e.g. a universal integrated circuit card (UICC) or subscriber identity module (SIM)) on which an authentication and key agreement (AKA) mechanism can be run. GBA has defined a generic mechanism that allows, based on a route secret stored in the user identity module, to generate and use derived secrets between the UE and different applications in a network. The GBA mechanism allows for different applications in the networks and terminals to avoid a large diversity of authentication mechanisms and allows addressing security issues once in a consistent way.

Authentication to HTTP based application servers owned by fixed network operators as well as the network itself is primarily password-based. Therefore, network operators which own only fixed access may not want to introduce user identity modules for the customers only for the purpose of GBA. Developing a password-based GBA would help these operators. The GBA mechanism is useful, as it can restrict the number of stored passwords in the network and to be managed by the user.

An example of client authentication for which secure communication is highly desirable is HTTP digest access authentication which verifies that both client and server know a shared secret (e.g. HTTP password). After verification, secure communications are commenced between the client and the server. The HTTP digest access authentication scheme is based on a simple challenge-response paradigm. The scheme involves a challenge being issued to the client using a nonce value. In security engineering, such a "nonce" stands for "number used once" and is often a random or pseudo-random number issued in an authentication protocol to ensure that old communications cannot be reused in replay attacks. In the HTTP digest access authentication, nonces are used to calculate a hashed digest of a password. Hashing may be based on an application of e.g. MD-5 cryptographic hashing. The nonces are different each time an authentication challenge response code is presented, and each client request has a unique sequence number, thus making the replay attack virtually impossible. A valid HTTP response to the challenge verifies knowledge of the shared secret.

According to a known authentication mechanism for using GBA based on HTTP digest (also known as GBA_H), changes to standard browsers including transaction layer security (TLS) are required, so that the UE and the BSF can access the TLS master secret for use in GBA. Furthermore, the GBA_H mechanism is vulnerable to a Main-In-The-Middle (MITM) attack where the attacker runs a TLS session with the BSF and interacts with the UE via HTTP outside of the TLS tunnel. The MITM needs to trick the UE into communication with the MITM using HTTP digest outside TLS. In order to achieve this, the MITM could be a corrupted server or an additional installed server, and the user could be tricked (e.g. by e-mail and/or social engineering techniques) to contact the MITM server requiring the user to run HTTP digest. Furthermore, users are not always aware when a secure connection is required or active in their browser.

Additionally, a 2G GBA solution is described in Annex I of TS 33.220 and uses TLS between the UE and the BSF. This solution ensures that the entropy of the bootstrapped key is greater than the entropy which can be reached by using one 2G authentication vector. At the same time, this solution is not vulnerable to the MITM attack. The bootstrapped key is derived from both the authentication result and some information which is transmitted inside the TLS tunnel. However, 2G GBA uses HTTP digest AKA for authentication and thus requires the root secret to be securely stored in a user identity module.

Therefore, a secure bootstrapping mechanism based on password-based HTTP digest authentication would be desirable, which alleviates at least one of the drawbacks of susceptibility to vulnerabilities of known HTTP digest based solutions, lack of key freshness for the bootstrapped key, lack of forward secrecy due to password disclosure and its effect on a bootstrapped key generated before the password compromise, and requirement of additional browser to transaction layer security stack interfaces.

SUMMARY

It is an object of the present invention to provide a secure bootstrapping mechanism based on a password-based digest authentication.

This object is achieved by a generic bootstrapping architecture method, said method comprising:
authenticating a client to a bootstrapping server and establishing a shared key between said client and said bootstrapping server;
using a password-based digest access authentication procedure; and securing said authentication procedure by at least one of modifying a digest response parameter with a user password and generating a bootstrapped key based on the user password and generating a bootstrapped key based on at least one fresh parameter not used in a previous protocol run between said client and said server.

Furthermore, the above object is achieved by a generic bootstrapping architecture adapted to authenticate a client to a bootstrapping server, to establish a shared key between said client and said bootstrapping server, to use a password-based digest access authentication procedure for said authentication and comprising at least one of response generating means for securing said authentication procedure by modifying a digest response parameter with a user password and bootstrapping means for securing said authentication procedure by generating a bootstrapped key based on at least one of the user password and at least one fresh parameter not used in a previous protocol run between said client and said server.

Accordingly, authentication of the user is based on at least one of a modified digest response parameter and an appropriate choice of input parameters for derivation of the bootstrapped key. MITM attacks can thereby be eliminated due to the fact that user involvement is ensured, so that the MITM does not know the password. Moreover, no special features are required from the TLS stack, so that dependency from lower protocol layers is removed and the overall architecture is made cleaner and hence more flexible.

The two alternative concepts of modifying the digest response parameter and generating the bootstrapped key based on at least one fresh parameter are linked by the common concept of providing user involvement so as to enhance security during exchange of authentication signaling.

According to a first aspect, the digest response parameter may be modified by applying a hash function to a user name, the user password, and a nonce value.

According to a second aspect, the digest response parameter may be modified by applying a hash function to the digest response parameter and the user password.

According to a third aspect, the bootstrapped key may be generated based on a password and a digest response parameter.

According to a fourth aspect, the bootstrapped key may be generated by applying a hash function to the at least one fresh parameter and an arbitrary string parameter.

According to fifth aspect, the bootstrapped key may be generated by applying the hash function to the at least one fresh parameter, the arbitrary string parameter, and a password.

In a specific example, the hash function may be a key derivation function used in a generic bootstrapping architecture.

The at least one fresh parameter may comprise nonce values exchanged between the client and the server. Alternatively, the at least one fresh parameter may comprise a digest response parameter. As another alternative, the at least one fresh parameter may comprise a server-specific random number.

The generic bootstrapping architecture method may further comprise modifying interfaces from the bootstrapping server to a terminal device of the client and to a subscriber database, while leaving interfaces between the bootstrapping server and a network application function and between the network application function and the terminal device in conformity with the specification underlying the password-based digest authentication procedure.

The client may be a mobile terminal device and the server may comprise a bootstrapping server function.

Other advantageous modifications are defined in the dependent claims.

BRIEF DESCRIPTION OF THE DRAWINGS

The invention will now be described in greater detail based on embodiments with reference to the accompanying drawings in which.

DESCRIPTION OF THE EMBODIMENTS

In the following, embodiments of the present invention will be described based on a GBA authentication infrastructure which is based on a HTTP digest mechanism to establish credentials, i.e., derive session key(s) between a client and a server.

Figure 1:
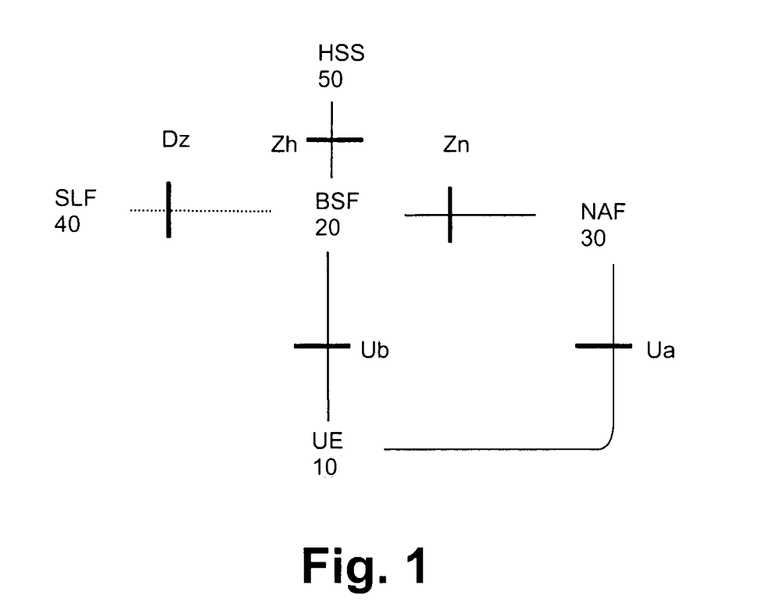
FIG. 1 shows a schematic architecture of an authentication infrastructure in which the present invention can be implemented.

FIG. 1 shows a schematic block diagram of the authentication architecture with the entities involved in a suggested bootstrapping approach. This architecture involves a user equipment (UE) 10, e.g. a mobile cellular telephone or the like, which needs access to a specific service, an application server 30 (e.g. a network application function (NAF)), which provides the service, a generic BSF 20 which arranges a security relation between the UE and the application server, and a mobile network operator's subscriber database 50 (e.g. a home subscriber server (HSS)), which hosts user profiles.

According to FIG. 1, the BSF 20 and the UE 10 are mutually authenticated and agree on session keys that may afterwards be applied between the UE 10 and the NAF 30. The BSF 20 can restrict the applicability of the key material to a specific NAF by using a key derivation procedure which may be used with multiple NAFs during the lifetime of the key material. This lifetime of the key material is set according to a local policy of the BSF 20. The BSF 20 is able to acquire GBA user security settings from the HSS 50.

After the bootstrapping has been completed, the UE 10 and the NAF 30 can run some application-specific protocol where the authentication of messages will be based on those session keys generated during the mutual authentication between the UE 10 and the BSF 20. The set of all user security settings is stored in the HSS 50. In cases where the subscriber has multiple subscriptions, the HSS 50 may contain one or more security settings which can be mapped to one or more private identities.

Furthermore, a subscriber locator function (SLF) 40 may be provided, which is queried by the BSF 20 in conjunction with a Zh interface operation to get the name of the HSS 50 containing required subscriber-specific data. The SLF 40 is accessed via a Dz interface. The SLF 40 is not required in a single HSS environment or when the BSF 20 is configured to use a pre-defined HSS.

The reference point Ub between the UE 10 and the BSF 20 provides mutual authentication between the UE 10 and the BSF 20. It allows the UE 10 to bootstrap the session keys. Furthermore, the reference point Ua between the UE 10 and the NAF 30 carries the application protocol, which is secured using the key material agreed between the UE 10 and the BSF 20 as a result of the HTTP digest authentication over reference point Ub. Additionally, the reference point Zh used between the BSF 20 and the HSS 50 allows the BSF 20 to fetch the required authentication information and all GBA user security settings from the HSS 50. Finally, the reference point Zn can be used by the NAF 30 to fetch the key material agreed during a previous HTTP digest authentication protocol run over the reference point Ub from the UE 10 to the BSF 20. It can also be used to fetch application-specific user security settings from the BSF 20, if requested by the NAF 30.

Figure 2:
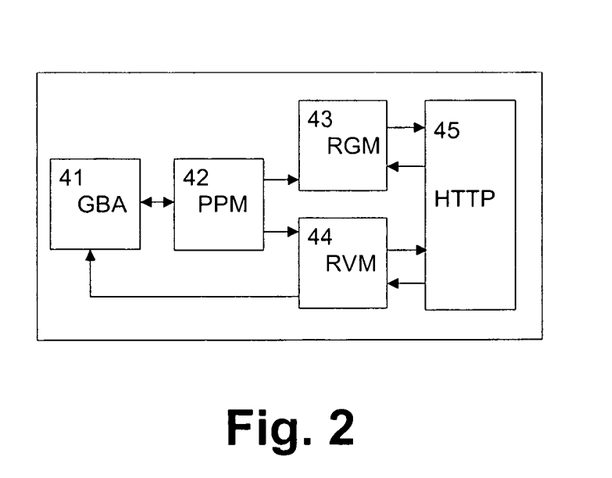
FIG. 2 shows a schematic block diagram of an authentication entity according to the embodiments.

FIG. 2 shows a schematic block diagram of an authentication entity which may be provided at the UE 10 or at the BSF 20 in FIG. 1. The authentication entity comprises a response generation module (RGM) 43, a password provisioning module (PPM) 42, and a HTTP password generating module which may employ, for example, a GBA 41. The GBA 41 is a framework architecture which allows bootstrapping (or changing) of a security key between the UE 10 and the BSF 20, which can then be used to further derive security keys for use between the UE 10 and the NAF 30. More specifically, the GBA 41 generates the HTTP password and sends the HTTP password to the PPM 42. The PPM 42 stores the HTTP password for all HTTP applications.

In operation, when a HTTP client application 45 requires a HTTP response to establish secure communications which a processing element (not shown) at the other connection end, the HTTP client application 45 sends a request to the RGM 43. The request comprises information including an application identity, a user name, optionally a hash of an HTTP payload if payload integrity protection is required, and a nonce, all of which are received from the processing element which may include a HTTP server. Following receipt of the request, the RGM 43 requests the HTTP password from the PPM 42. The PPM 42 sends the HTTP password to the RGM 43 which then sends a HTTP response to the HTTP client application 45 to permit establishment of secure communications with the processing element.

In an operation for verification of a server digest response, a response verification module 44 is provided. If a server digest response is received by the HTTP client application 45, a verification request is sent to the RVM 44. The verification request comprises information including the server digest response and optionally a hashed entity body and a client nonce (cnonce), etc. The RVM 44 then requests the HTTP password from the PPM 42. The PPM 42 sends the HTTP password to the RVM 44 which then generates a calculated server digest response according to a security algorithm or security function. The RVM 44 then checks validity of the server digest response compared to the calculated server digest response and sends verification results to the HTTP client application 45 to verify the server digest response.

The authentication entity of FIG. 2 may be implemented by discrete hardware circuits on a single chip or a chip set or a module, or may be implemented based on software routines providing the functions of blocks 41 to 45.

According to the following embodiments, a secure bootstrapping mechanism based on password-based HTTP digest is provided by at least one of an authentication of a user based on at least one of a modified digest response and an appropriate choice of input parameters for the key derivation. Additionally, the Ub protocol may be run over TLS with authentication of the BSF 20 based on server certificates.

Figure 3:
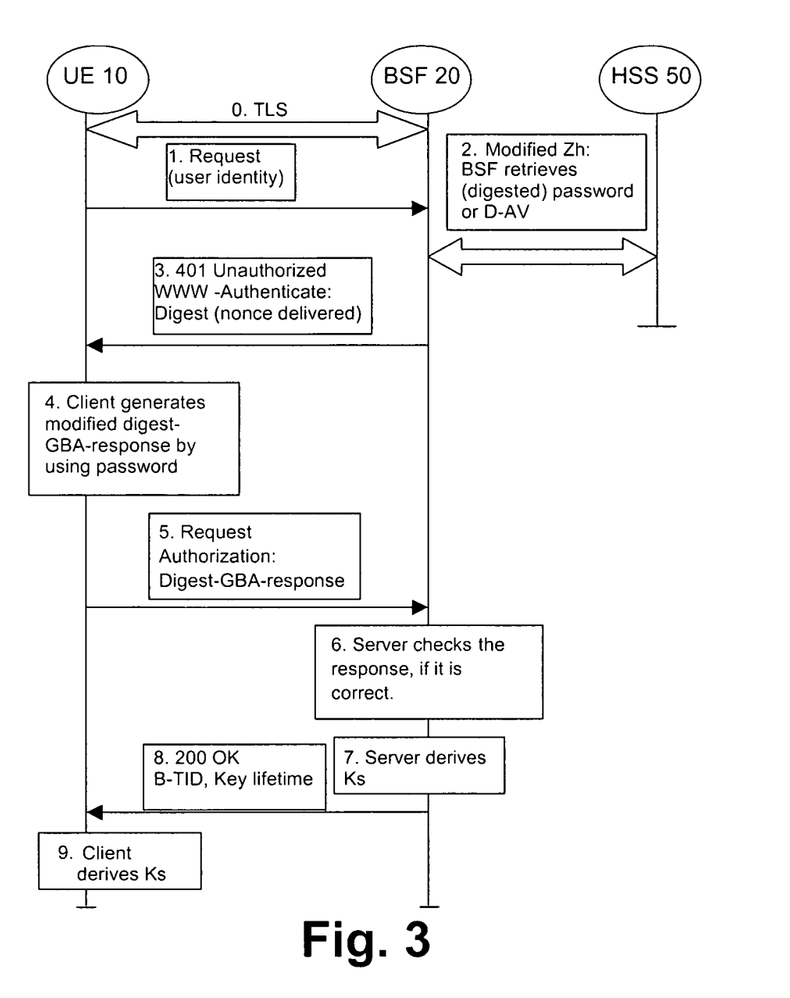
FIG. 3 shows a schematic processing and signaling diagram of an authentication procedure according to a first embodiment.

According to a first embodiment, the protocol on the Ub interface is modified so that—instead of returning a parameter digest-response=H(user name, password, nonce, . . . ), as specified in the conventional HTTP digest (where H is a hash function, e.g. MD-5)—the UE 10 returns a parameter digest-GBA-response=H*(digest-response, password, . . . ) to the BSF 20, where digest-response is the conventional HTTP digest-response and H* is another hash function (e.g. the key derivation function (KDF) used in GBA). This way proper user involvement is ensured, so that the MITM does not know the password.

FIG. 3 shows an exemplary and schematic processing and signaling diagram of the first embodiment.

In an initial step 0 the UE 10 starts the bootstrapping procedure by initiating a TLS session with the BSF 20. The UE 10 and the BSF 20 negotiate a server-side only authenticated TLS. The UE 10 authenticates the BSF 20 by a certificate presented by the BSF 20. The BSF 20 does not require authentication from the UE 10 at this point. After negotiation of TLS, the UE 10 sends a HTTP request message to the BSF 20, which contains a private user identity in an authentication header thereof (step 1). In response thereto, data retrieval from the HSS 50 is performed in step 2. More specifically, the BSF 20 sends a query to the HSS 50 to retrieve a password, a digested password, or a digest authentication vector (D-AV) for the user. The D-AV consists of the qop (quality of protection) value, the authentication algorithm, realm, and a hash, called H(A1), of the IMPI (IP Multimedia Private Identity, i.e. a private user identity), realm, and password. Reference is made to RFC 2617 for additional information on the values in the authentication vector for SIP Digest based authentication.

The HSS 50 responds with the appropriate authentication vector for the user and an algorithm. The contents of the authentication vector allows the BSF 20 to calculate a challenge to the UE 10.

In step 3, the BSF 20 response to the UE request with a 401 Unauthorized message comprising a WWW-authenticate header to force the UE 10 to authenticate itself. The WWW-authenticate header includes various authentication parameters, such as a digest-response parameter. Then, in step 4, the client at the UE 10 generates a modified digest-GBA-response parameter for the authentication response. Thereby, user authentication can be improved to counteract an MITM attack. The modified digest-GBA-response parameter can no longer be computed merely from the knowledge of the parameter digest-response included in the WWW-authenticate header. In step 5, the client sends the modified digest-GBA-response parameter through the TLS tunnel to the BSF 20. The BSF 20 checks the response for correctness in step 6. Thereafter, in step 7, the BSF 20 derives a bootstrapped key (or GBA key) Ks and sends a 200 OK message including the key lifetime and a bootstrapping transaction identifier (B-TID) to the UE 10 to indicate successful authentication. Finally, in step 9, the client at the UE 10 also derives the bootstrapped key Ks.

The digest-GBA-response parameter may be calculated in step 4 based on the equation:

$$\text{Digest-GBA-response}=KDF(\text{para1},\text{para2},\ldots),$$

wherein para1, para2, . . . are parameters and KDF denotes a key derivation function. One of these parameters may be the password, and another parameter may be a function of the nonce parameter, as defined for example in the IETF specification RFC 2617. The inclusion of the password in the above hashing function (e.g. KDF function) is used to check user involvement and thereby prevent client impersonation, and the inclusion of the nonce parameter or a function thereof prevents replay of response messages on the Ub interface.

According to a first implementation example of the first embodiment, the parameter digest-GBA-response may be calculated based on the following equation:

$$\text{Digest-GBA-response}=KDF(\text{password},\text{digest-response},\text{"3GPP-gba-digest-authentication"}),$$

wherein the password and the parameter digest-response may correspond to RFC 2617, and the parameter "3GPP-gba-digest-authentication" may be a text string.

In another implementation example, the parameter digest-GBA-response may be calculated as follows:

$$\text{Digest-GBA-response}=KDF(\text{user name},\text{password},\text{nonce}),$$

wherein KDF may be different from the key derivation function MD-5 used in RFC 2617.

Of course, other parameter combinations may be used as well in the first preferred embodiment.

The generation or calculation of the parameter digest-GBA-response may be performed in the RGM 43 of the authentication entity shown in FIG. 2.

Figure 4:
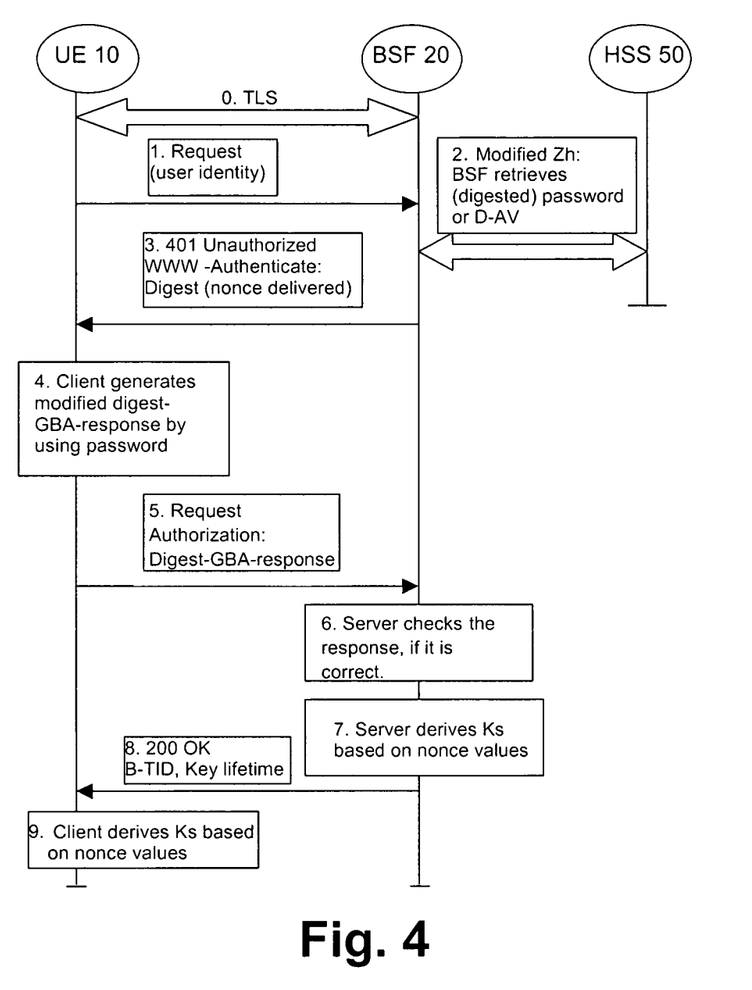
FIG. 4 shows a schematic processing and signaling diagram of an authentication architecture according to a second embodiment.

FIG. 4 shows a schematic processing and signaling diagram according to a second preferred embodiment, where the bootstrapped or GBA key Ks is derived from nonce values exchanged over the secure TLS connection. The steps of the procedure shown in FIG. 4 mainly correspond to those in FIG. 3, so that only different steps are explained in the following.

The GBA key Ks may be calculated as follows:

$$Ks = H^*(\text{"3gpp-gba-ks-digest"},\text{nonce},\text{cnonce},\ldots).$$

wherein the first string "3gpp-gba-ks-digest" has an arbitrarily chosen value to distinguish this particular form of key derivation from other types of key derivations.

In steps 4 and 5, the modified digest-response parameter is calculated and forwarded to prevent the MITM attack. Thereby, the second embodiment builds on the first embodiment and enhances it by not deriving Ks from the TLS master secret and thus eliminating the need to have an interface to the TLS stack. However, contrary to the procedure of the first preferred embodiment, the bootstrapped or GBA keys are derived in steps 7 and 9 based on exchanged nonce values. This modified way of deriving the GBA key Ks allows to avoid additional browser to TLS stack interfaces. Of course, the enhanced user authentication based on the modified digest-GBA-response parameter may as well be used in the second embodiment. However, it can also be dispensed with.

According to the second embodiment, it is ensured that the GBA key Ks is a function of a fresh parameter, i.e. a parameter not used in a previous protocol run, exchanged over the encrypted TLS connection between the user and the BSF 20.

According to a first implementation example of the second embodiment, freshness can be achieved through a combination of the two parameters nonce and cnonce. Use of the nonce parameter (a value uniquely generated by the server and used as challenge for the client) guarantees freshness of the GBA key Ks to the BSF 20. Additionally, use of the cnonce parameter (a value uniquely generated by the client that here adds the freshness to the GBA key Ks) guarantees freshness of the GBA key Ks to the user (client). As an implementation example, the GBA key Ks could be derived based on the following equation:

$$Ks=KDF(\text{"3gpp-gba-ks-digest"},\text{nonce},\text{cnonce},\ldots)$$

According to a second implementation example, the password and the parameter digest-response can be used instead of the nonce and cnonce parameters in order to derive the GBA key Ks. It is noted that the parameter digest-response is derived from both nonce and cnonce parameter.

In this case, the GBA key Ks is derived based on the following equation:

$$Ks=KDF(\text{"3gpp-gba-ks-digest"},\text{password},\text{digest-response},\ldots).$$

In a third implementation example, a value "Ks-input" as specified in annex 1 of TS 33.220 and sent by the BSF 20 along with the nonce parameter could be used as input to the derivation of the GBA key Ks. In this case, Ks could even be set equal to this value "Ks-input".

Figure 5:
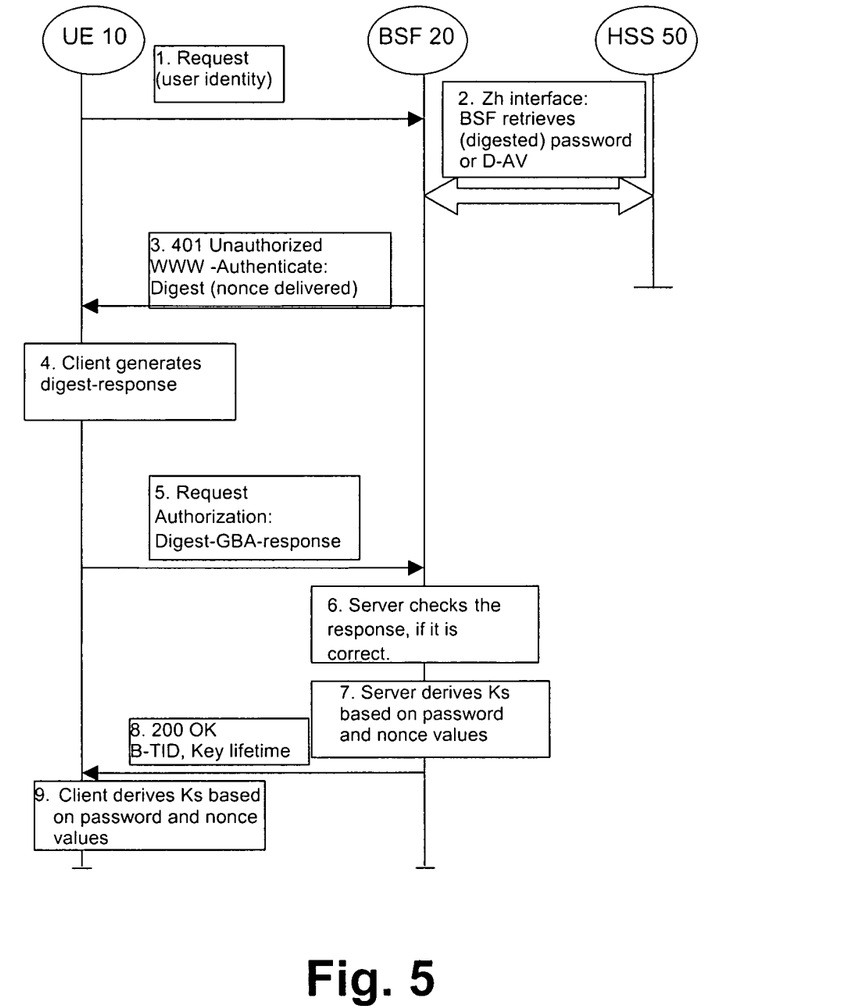
FIG. 5 shows a schematic processing and signaling diagram of an authentication procedure according to a third embodiment.

FIG. 5 shows a schematic signaling and processing diagram according to a third embodiment, in which the use of TLS can be dropped to thereby make the solution very simple. However, a breach of the password can make all past GBA keys Ks known if the bootstrappings on the Ub interface were recorded by an attacker.

It is assumed that the BSF 20 is authenticated by means of the mutual authentication, i.e. by using the response-digest parameter in the authentication information header, e.g. as specified in RFC 2617. Thus, most steps of FIG. 5 correspond to those of FIG. 4 with the exception that the TLS step 0 has been omitted. However, the derivation of the GBA key Ks in steps 7 and 9 is further enhanced by ensuring that a shared secret, i.e. the password, is involved. Thus, the GBA key Ks may be calculated by using the following equation:

$$Ks=H^*(\text{"3gpp-gba-ks-digest"},\text{password},\text{nonce},\text{cnonce},\ldots).$$

More specifically, where the hashing function is the KDF and no further parameters are involved, the equation becomes:

$$Ks=KDF(\text{"3gpp-gba-ks-digest"},\text{password},\text{nonce},\text{cnonce})$$

with a direct use of the nonce and cnonce parameters.

According to another implementation example, the password could be combined with the digest-response parameter, so that the calculation of the GBA key Ks is based on the following equation:

$$Ks=KDF(\text{"3gpp-gba-ks-digest"},\text{password},\text{digest-response}).$$

Accordingly, the password provides the required secrecy and thus avoids that a MITM or third party can compute the GBA key Ks, since both nonce and cnonce value may be available to a third party. The digest-response parameter or nonce and cnonce parameters provide the required freshness.

The key derivation steps 7 and 9 in FIGS. 3 to 5 may be performed in the GBA 41 of FIG. 2 based on the required parameters which can be delivered by the RVM 44.

Figure 6:
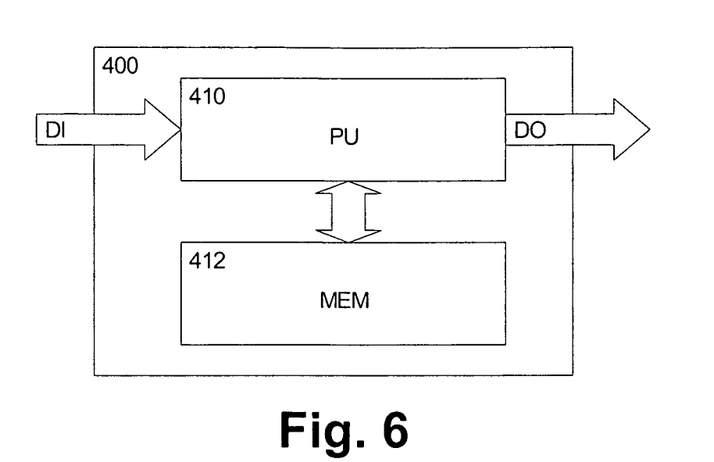
FIG. 6 shows a schematic block diagram of a software-based implementation according to a fourth embodiment of the present invention.

FIG. 6 shows a schematic block diagram of an alternative software-based implementation according to a fourth embodiment. The required functionalities can be implemented in any authentication entity (which may be provided in the UE 10 or the BSF 20) with a processing unit 410, which may be any processor or computer device with a control unit which performs control based on software routines of a control program stored in a memory 412. The control program may also be stored separately on a computer-readable medium. Program code instructions are fetched from the memory 412 and are loaded to the control unit of the processing unit 410 in order to perform the processing steps of the above functionalities of FIGS. 2 to 5, which may be implemented as the above mentioned software routines. The processing steps may be performed on the basis of input data DI and may generate output data DO. The input data DI may correspond to the authentication parameters mentioned in the above equations for calculating the GBA key Ks or the digest-GBA-response parameter, and the output data DO may correspond to the GBA key Ks or the digest-GBA-response parameter.

Consequently, the above embodiments may be implemented as a computer program product comprising code means for generating each individual step of the signaling procedures of FIGS. 3 to 5 for the respective authentication entity when run on a computer device or data processor of the respective authentication entity at the UE 10 or the BSF 20 or any corresponding terminal device or network entity.

In summary, a method, apparatus, and computer program product have been described, in which a password-based digest access authentication procedure is used for performing authentication between a client and a server, wherein the authentication procedure is secured by at least one of modifying a digest-response parameter with a user password and generating a bootstrapped key based on the user password and at least one fresh parameter not used in a previous protocol run between the client and the server.

It is apparent that the invention can easily be extended to any service and network environment (fixed and wireless), where a password-based digest access authentication procedure is used. It can be used in connection with any authentication between a client and a server. More specifically, the BSF 20 may as well be any authentication authorization and accounting (AAA) server or any other attachment node with a BSF or AAA functionality. The embodiments may thus vary within the scope of the attached claims.

The invention claimed is:

1. A generic bootstrapping architecture method, said method comprising:
   a) authenticating a client to a bootstrapping server and establishing a shared key between said client and said bootstrapping server;
   b) in authenticating the client to the bootstrapping server, using a digest access authentication procedure based on a user password;
   c) securing the authentication procedure by using a key derivation function (KDF) that calculates a modified digest response parameter, the KDF using the user password and a digest response parameter as input values, the digest response parameter being calculated using a hash function which uses a nonce as an input; and
   d) generating a bootstrapped key to serve as the shared key based on the digest response parameter, the digest response parameter not having been used in a previous protocol run between said client and said server, wherein the bootstrapped key is then available to further derive security keys for use between the client and a network application function in a derivation subsequent to the generation of the bootstrapped key, wherein the bootstrapping server comprises a bootstrapping server function.

2. The method according to claim 1, further comprising generating said bootstrapped key by applying a second hash function to said digest response parameter and an arbitrary string parameter.

3. The method according to claim 1, wherein said digest response parameter comprises nonce values exchanged between said client and said server.

4. The method according to claim 1, wherein said digest response parameter comprises a server-specific random number.

5. The method according to claim 1, wherein said client is a mobile terminal device.

6. A generic bootstrapping architecture apparatus, comprising:
   one or more processors; and
   one or more memories including computer program code, the one or more memories and the computer program code configured, with the one or more processors, to cause the apparatus to perform at least the following:
   authenticate a client to a bootstrapping server;
   establish a shared key between said client and said bootstrapping server;
   in authenticating the client to the bootstrapping server, use a digest access authentication procedure based on a user password to ensure user involvement;
   secure the authentication procedure by using a key derivation function (KDF) that calculates a modified digest response parameter, the KDF using the user password and a digest response parameter as input values, the digest response parameter being calculated using a hash function which uses a nonce as an input; and
   generate a bootstrapped key to serve as the shared key based on the digest response parameter, the digest response parameter not having been used in a previous protocol run between said client and said server, wherein the bootstrapped key is then available to further derive security keys for use between at least one of the client and the bootstrapping server and a network application function in a derivation subsequent to the generation of the bootstrapped key, wherein the bootstrapping server comprises a bootstrapping server function.

7. The apparatus according to claim 6, wherein said apparatus performs said bootstrapping by generating said bootstrapped key by applying a second hash function to said digest response parameter, an arbitrary string parameter, and said user password.

8. The apparatus according to claim 6, wherein said digest response parameter comprises nonce values exchanged between said client and said server.

9. The apparatus according to claim 6, wherein said digest response parameter comprises a server-specific random number.

10. The apparatus according to claim 6, wherein said client is a mobile terminal device.

11. A computer program product stored on a non-transitory computer readable medium and comprising:
code for producing the steps of:
authenticating a client to a bootstrapping server and establishing a shared key between said client and said bootstrapping server;
in authenticating the client to the bootstrapping server, using a digest access authentication procedure based on a user password;
securing the authentication procedure by using a key derivation function (KDF) that calculates a modified digest response parameter, the KDF using the user password and a digest response parameter as input values, the digest response parameter being calculated using a hash function which uses a nonce as an input; and
generating a bootstrapped key to serve as the shared key based on the digest response parameter, the digest response parameter not having been used in a previous protocol run between said client and said server, wherein the bootstrapped key is then available to further derive security keys for use between the client and a network application function in a derivation subsequent to the generation of the bootstrapped key, wherein the bootstrapping server comprises a bootstrapping server function.

12. The computer program product according to claim 11, further comprising code for producing the step of generating said bootstrapped key by applying a second hash function to said digest response parameter and an arbitrary string parameter.

13. The computer program product according to claim 11, wherein said digest response parameter comprises nonce values exchanged between said client and said server.

14. The computer program product according to claim 11, wherein said digest response parameter comprises a server-specific random number.

15. The computer program product according to claim 11, wherein said client is a mobile terminal device.

16. A generic bootstrapping architecture method, said method comprising:
a) authenticating a client to a bootstrapping server and establishing a shared key between said client and said bootstrapping server;
b) in authenticating the client to the bootstrapping server, using a digest access authentication procedure based on a password;
c) securing the authentication procedure by calculating a digest response parameter based on the password;
d) generating a bootstrapped key to serve as the shared key based on the digest response parameter, the digest response parameter not having been used in a previous protocol run between said client and said server, wherein the bootstrapped key is then available to further derive security keys for use between the client and a network application function in a derivation subsequent to the generation of the bootstrapped key; and
modifying interfaces from said bootstrapping server to a terminal device of said client and to a subscriber database, while leaving interfaces between said bootstrapping server and the network application function and between said network application function and said terminal device in conformity with a specification underlying said password-based digest access authentication procedure.

\* \* \* \* \*